United States Patent Office 3,070,626
Patented Dec. 25, 1962

3,070,626
PREPARATION OF DIESTERS OF DECANE-1,10-DICARBOXYLIC ACID
Robert J. Convery, Wilmington, Del., assignor to Sun Oil Company, Philadelphia, Pa., a corporation of New Jersey
No Drawing. Filed Nov. 25, 1959, Ser. No. 855,254
4 Claims. (Cl. 260—485)

This invention relates to the preparation of diesters of decane-1,10-dicarboxylic acid to form oily products having high viscosity index which are useful as synthetic lubricants or as additives for lubricating oils.

It is known that cyclododdecatriene-1,5,9 can be prepared by contacting butadiene with a catalyst formed from titanium tetrachloride and diethyl aluminum chloride in a hydrocarbon solvent. This catalyst system produces the trans-trans-cis form of the triene exclusively. It is also known that cyclododecatriene-1,5,9 can be prepared by contacting butadiene with a catalyst system which is aluminum triethyl together with either chromyl chloride or chromic chloride in a hydrocarbon solvent. The latter type of catalyst system produces mainly the trans-trans-trans form of the triene but also causes the formation of substantial amounts of the trans-trans-cis isomer.

Cyclododecatriene-1,5,9 can be converted into a monoglycol derivative having two double bonds in the ring, namely, 1,2-dihydroxy cyclododecadiene-5,9, in the manner disclosed and claimed in my copending application Serial No. 843,052, filed September 29, 1959, now abandoned. This conversion is done by reacting the cyclododecatriene, preferably at a temperature of about 40–45° C., with performic acid in a molar ratio of performic acid to cyclododecatriene less than 1.25 and preferably in nearly equal molar amounts.

The 1,2-dihydroxy cyclododecadiene obtained in the foregoing manner is used as starting material for the present process. According to the invention, such monoglycol is first reacted with hydrogen in the presence of a hydrogenation catalyst to remove the double bonds and yield cyclododecane-1,2-diol. The latter is then reacted with an oxidizing agent to form decane-1,10-dicarboxylic acid. This acid is then admixed with at least two mols of a monool for each mol of acid and the mixture is reacted in the presence of an esterification catalyst to yield the desired diester of decane-1,10-dicarboxylic acid.

The alcohol employed in the esterification step of the present process can be any monool having 1–30 carbon atoms. Either straight chain or branched chain monools can be used. For example, the alcohol can be propyl, butyl, amyl, hexyl, octyl, dodecyl alcohol and the like. The alcohol should be selected to produce an ester having the molecular weight desired.

The hydrogenation step for removing the double bonds from the 1,2-dihydroxy cyclododecadiene can readily be carried out at room temperature in the presence of a hydrogenation catalyst and at an elevated pressure of hydrogen. Preferably Raney nickel is employed as the catalyst and a pressure of the order of 100–500 p.s.i.g. is used. The step of oxidizing the hydrogenated material to form carboxyl groups preferably is carried out by means of aqueous potassium permanganate in the presence of an alkali metal hydroxide such as KOH, although other strong oxidizing agents such as potassium dichromate or nitric acid also can be used. A mildly elevated temperature such as 30–60° C. generally is employed for the oxidation reaction. The oxidation product is obtained in the form of the alkali metal salt of decane-1,10-dicarboxylic acid which subsequently can be acidified with a mineral acid to release the dibasic acid.

In the esterification step an acid catalyst is used, for example, sulfuric acid, benzene sulfonic acid, toluene sulfonic acid or a highly acid ion exchange resin. Preferably an inert solvent such as benzene is added to the system and the esterification is carried out under refluxing conditions with water formed from the reaction being trapped out of the benzene reflux. Generally a time of reaction of up to 30 hours is used. The reaction is continued as long as any water is being formed in the system and is complete when no more water appears in the benzene. After the reaction is over, the product is treated with a suitable agent for removing the catalyst, for example, a metal carbonate such as cupric carbonate. It is then filtered and distilled to remove the benzene and excess alcohol.

The following more specifically illustrates the preparation of a diester according to the invention, the particular diester so prepared being the 2-ethylhexyl diester of decane-1,10-dicarboxylic acid:

The starting material was crystalline 1,2-dihydroxy cyclododecadiene prepared by reacting cyclododecatriene-1,5,9 with a slight molar excess of performic acid at a temperature of about 40–45° C. in the manner disclosed in my aforesaid copending patent application. Hydrogenation of the double bonds of this crystalline glycol was carried out by placing in a rocker bomb a mixture of 20 g. of the glycol, 500 ml. of ethyl alcohol as solvent and 10 g. of Raney nickel. Hydrogen was pressured into the bomb to a pressure of 300 p.s.i.g. and the reaction proceeded at room temperature. As the hydrogen was consumed and the pressure correspondingly dropped, additional hydrogen was admitted intermittently to raise the pressure back to 300 p.s.i.g. The reaction was essentially complete after about one hour. The mixture was then filtered to remove the catalyst and was reduced to a volume of 50 ml. by distilling off most of the ethyl alcohol. Upon cooling the residue to about 5–10° C., 17 g. of crystalline cyclododecane-1,2-diol having a melting point of 161.5–162.5° C. was obtained.

Conversion of the saturated glycol to a straight chain dibasic acid was done in the following manner. A mixture of 17 g. of cyclododecane-1,2-diol, 8 g. of KOH and 200 ml. of water was heated to 45–50° C. A solution of 78 g. of $KMnO_4$ in one liter of water was added slowly with stirring and the temperature was maintained at 45–50° C. for 2 hours by heating. The heating was then discontinued and the mixture was stirred for 16 hours more, after which it was filtered to remove manganese oxide. The filtrate was treated with sodium sulfite to destroy excess $KMnO_4$ and then acidified with concentrated HCl. This resulted in precipitation of the dibasic acid derivative, which was thereafter further purified by recrystallization from water. 10 g. of decane-1,10-dicarboxylic acid having a melting point of 130–131° C. was thereby obtained.

Esterification of the decane-1,10-dicarboxylic acid was carried out by admixing 9 g. of it with 10.4 g. of 2-ethylhexanol, 0.2 ml. of concentrated sulfuric acid and 150 ml. of benzene as solvent, refluxing the mixture and trapping out water obtained from the reflux. After about 26 hours no further amount of water appeared in the reflux, thus indicating completion of the esterification reaction. The mixture was then treated with 0.6 g. of $CuCO_3$ to remove the sulfuric acid and filtered. It was then subjected to distillation to remove benzene and excess 2-ethylhexanol and the diester was heated under a pressure of 0.5 mm. Hg until a pot temperature of 235° C. was reached. About 10 g. of the diester was obtained as an oily bottom product. This material was found to have a viscosity index of 125 which indicates its utility as a special lubricant.

This application is a continuation-in-part of my aforesaid copending application Serial No. 843,052.

I claim:

1. Method of preparing a diester of decane-1,10-dicarboxylic acid which comprises reacting 1,2-dihydroxy cyclododecadiene with hydrogen in the presence of a hydrogenation catalyst to form cyclododecane-1,2-diol, reacting the latter compound with an oxidizing agent selected from the group consisting of an alkali metal permanganate, nitric acid and an alkali metal dichromate to form decane-1,10-dicarboxylic acid, adding to said acid at least two mols of a monool for each mol of said acid and reacting the mixture in the presence of an acidic esterification catalyst, and separating from the reaction mixture a diester of decane-1,10-dicarboxylic acid.

2. Method according to claim 1 wherein the oxidizing agent is aqueous potassium permanganate, the oxidation is carried out at a temperature in the range of 30–60° C. in the presence of an alkali metal hydroxide to form alkali metal salt of decane-1,10-dicarboxylic acid, and the latter is reacted with a mineral acid to release the decane-1,10-dicarboxylic acid.

3. Method of preparing decane-1,10-dicarboxylic acid which comprises reacting 1,2-dihydroxy cyclododecadiene with hydrogen in the presence of a hydrogenation catalyst to form cyclododecane-1,2-diol, and reacting the latter compound with an oxidizing agent selected from the group consisting of an alkali metal permanganate, nitric acid and an alkali metal dichromate to form decane-1 10-dicarboxylic acid.

4. Method according to claim 3 wherein the oxidizing agent is aqueous potassium permanganate, the oxidation is carried out at a temperature in the range of 30–60° C. in the presence of an alkali metal hydroxide to form alkali metal salt of decane-1,10-dicarboxylic acid, and the latter is reacted with a mineral acid to release the decane-1,10-dicarboxylic acid.

References Cited in the file of this patent

UNITED STATES PATENTS

| | | |
|---|---|---|
| 2,373,942 | Bergsteinsson | Apr. 17, 1945 |
| 2,585,129 | Gebhart et al. | Feb. 12, 1952 |
| 2,978,464 | Wiese | Apr. 4, 1961 |

OTHER REFERENCES

Kobayashi: "Chem. Abstracts," vol. 49, No. 17, Sept. 10, 1955, page 11553 relied on.

Prelog et al.: "Helvetica Chimica Acta," vol. 38, pp. 1786–1794 (1955).